APPARATUS FOR SYNCHRONIZING CYCLICALLY MOVING MEMBERS

Filed Feb. 12, 1964 2 Sheets-Sheet 1

INVENTORS,
GERARDUS L. REIJNS
AAGE TEIEN.
BY Harry M. Saragovitz,
E. J. Kelly, H. Berl & J. C. Keppler
ATTORNEYS INVENTORS,
GERARDUS L. REIJNS
AAGE TEIEN.
BY Harry M. Saragovitz,
E. J. Kelly, H. Borl & J.C. Keppler
ATTORNEYS

3,311,882
APPARATUS FOR SYNCHRONIZING CYCLICALLY MOVING MEMBERS

Gerardus L. Reijns, Voorburg, and Aage Teien, The Hague, Netherlands, assignors to the United States of America as represented by the Secretary of the Army Filed Feb. 12, 1964, Ser. No. 344,515
Claims priority, application Netherlands, Feb. 14, 1963, 288,951
4 Claims. (Cl. 340—147)

Figure 1:
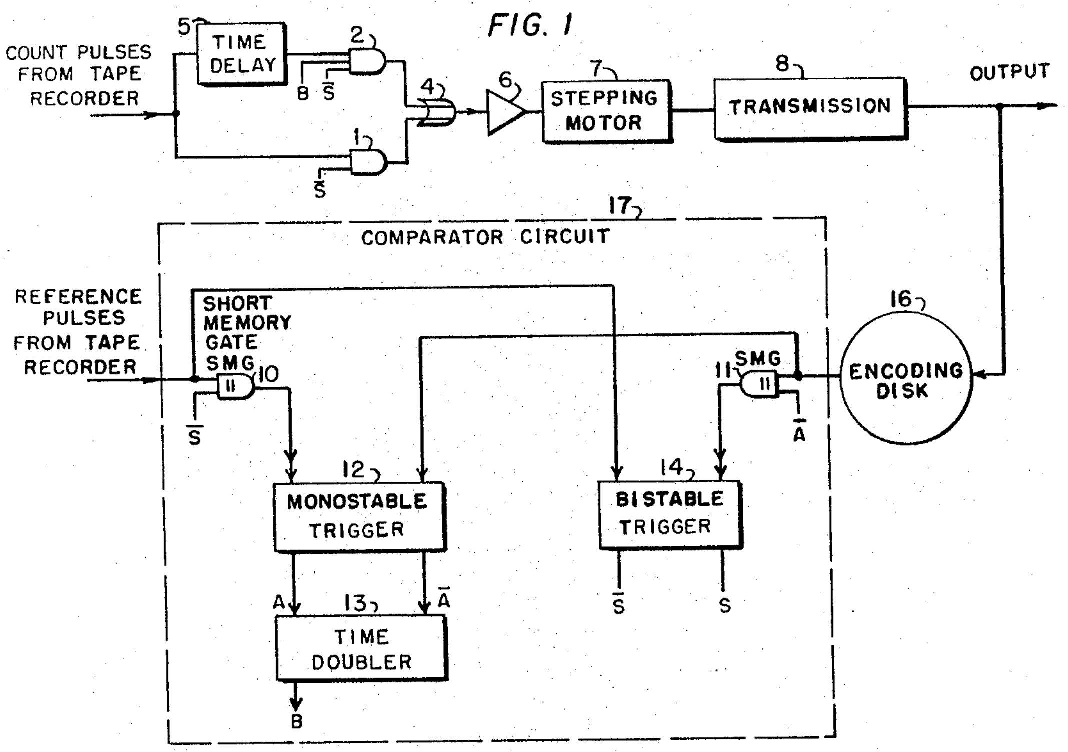

This invention relates to a device for reproducing the movement of a body which, while moving, repeatedly passes through the same series of positions.

The repetition need not take place with the same speed, neither need the speed be constant throughout the whole of the run. However, in the embodiment which will be described hereafter, the invention is indeed restricted to the reproduction of movement in the repetition of which each position is only once passed through, so that the movement can be called a monotonous one.

In order to fix the mind, the invention will hereinafter be illustrated by the description of its application to a continuously rotating encoder disk, which can, for instance, be fixed to the shaft of a radar antenna.

The disk, which is fixed to the shaft, is devised in such a way that two series of pulses are excited by its rotation. The pulses of the first series will be called count pulses, those of the second series reference pulses.

The count pulses can in principle be excited photoelectrically, by diposing along the periphery of the disk holes or transparent parts, on to which falls a pencil of rays, which influences a photoresistance. The reference pulses can be excited in like manner.

The count pulses serve the purpose of driving a second disk. This is effected by means of a stepping motor. The second disk is coupled to this motor, which is at each pulse, stepped over a determined angle via a transmission.

This second disk can only then give a completely accurate reproduction of the movement of the first disk if at any moment the information from the second disk, calculated with respect to a not co-rotating point, for instance the fixed point where the information is read, corresponds with the information coming from the first disk. Whether the radius on which this fixed point is situated has the same direction as with the first disk, is not essential.

If it is desired to have the possibility of reproducing the movement of the disk at a later time, it is necessary to record the movement on some medium or other.

To this end, for instance, both series of pulses deriving from the disk are recorded on a magnetic tape.

In representing the movement, a disk of the same type as the one that is mounted on the shaft, is driven by a stepping motor, which is fed by the count pulses of the magnetic tape.

The second series of pulses serves the purpose of adjusting the position of the driven disk in conformation to that of the first disk with respect to the said fixed point.

In general, the position of the second disk will in the beginning not be such that the information of the second disk, relative to the selected fixed point, corresponds with the information coming from the first disk. In order to bring about a complete synchronization irrespective of the starting position, the pulses of the second series, hereinafter called reference pulses, will be used.

The said reference pulses are excited at determined positions of the rotating disk and recorded on the magnetic tape if a reproduction at a later time is required.

The disk imitating the movement of the first one is arranged in such a manner that reference pulses are also excited at the analogously situated points.

The synchronization is complete, as soon as the reference pulses coming from the first disk, which in the case here represented have been recorded on the tape, occur simultaneously with the analogously situated ones of the second disk.

If the reference pulses are excited in positions having mutually equal angle differences, then the movement reproduced can, indeed, be synchronous to the original movement, but the condition that the same information must pass by the selected fixed point at any given moment, is no longer being continually fulfilled.

In order to fulfill this condition, the reference points should be distributed along the periphery in such a way that the reference points of two identical disks cover each other in one position only. The same holds good for bodies other than disks.

In a disk, this implies an unsymmetrical distribution of the reference points along the periphery.

It is hereinafter assumed that the movement of the first disk has been recorded on some medium or other, although this is in no wise necessary.

A deviation between the positions of the first and second disks expresses itself by the reference pulses recorded on the magnetic tape arriving earlier or later, in time, than the reference pulses coming from the second disk.

If a reference pulse arrives from the tape which is not immediately followed by a reference pulse from the second disk, then extra pulses are given by means of a comparator circuit which is to be described further, which pulses increase the speed of the second disk. If a reference pulse arrives from the second disk and is not immediately followed by a pulse from the tape, then the supply of driving pulses to the stepping motor is temporarily stopped by means of the aforesaid comparator circuit.

The aforesaid unsymmetrical distribution of the places in which reference pulses are excited, results in a retardation and acceleration of the driving of the second disk, until the analogously situated reference pulses occur practically simultaneously.

The way in which the count pulses and the reference pulses are generated is not essential significance for the invention.

Of some importance, although this is not essential, is, that the reference pulses should not coincide with the count pulses, but should occur between two count pulses, because in this case one single transmitting or recording channel can be employed for both series of pulses, as will be explained later on.

In principle the count pulses can be excited photoelectrically by providing along the periphery of the disk holes or transparent parts, on to which falls a pencil of rays which influences a photoresistance. The reference pulses can be excited in the self-same manner with the aid of holes provided on a somewhat smaller or somewhat larger circular periphery, the centres of the said holes being situated on radii between the holes of the count pulses.

An embodiment of the invention will now be illustrated with reference to the accompanying drawing.

FIG. 1 gives a general survey of the manner in which the movement is reproduced.

Figure 2:
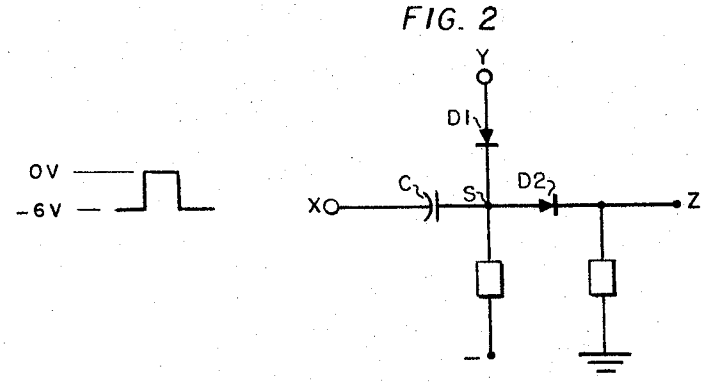

FIG. 2 represents a detail of FIG. 1.

Figure 3:
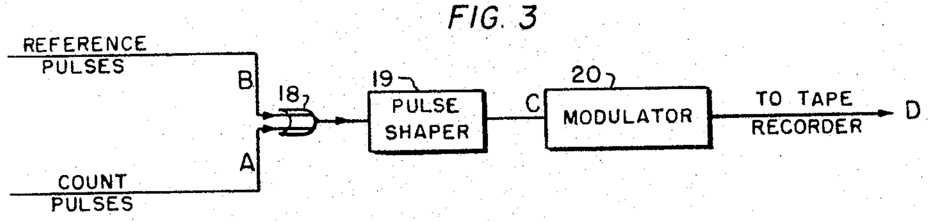
Figure 3A:
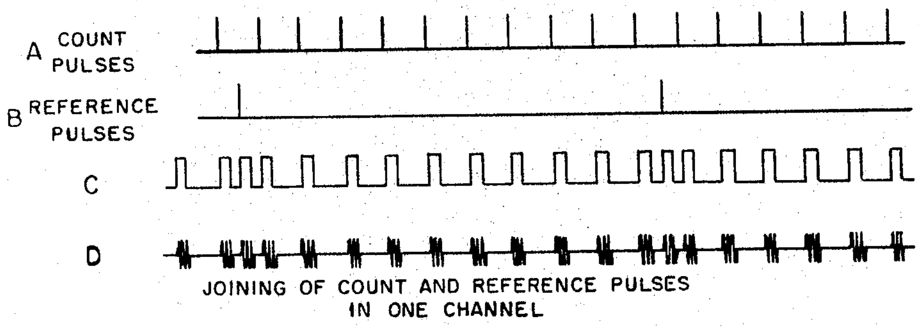

FIG. 3 and 3*a* represent a special construction for joining the two series of pulses, in order to enable the use of one single recording or transmitting channel.

Figure 4:
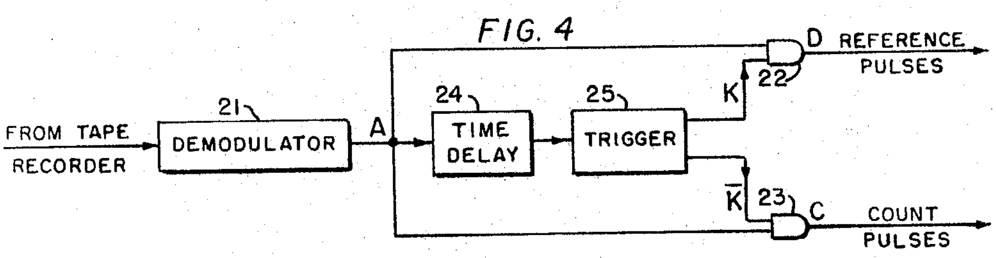
Figure 4A:
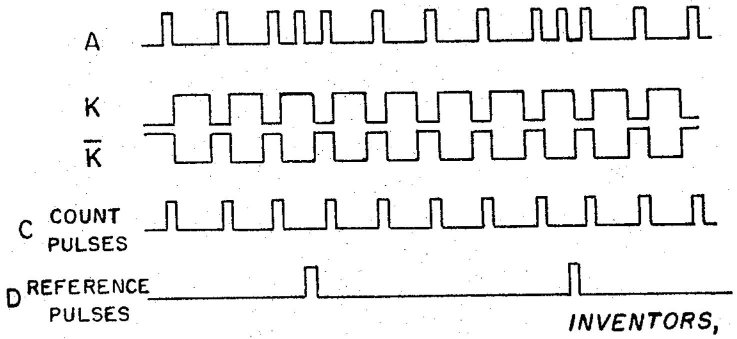

FIG. 4 and 4*a* show how the two series of pulses, which have been joined as indivated in FIG. 3, are separated again.

FIG. 1 mainly consists of two parts, the first part comprising the driving mechanism for the disk 16, which is to imitate the movement of the first disk. The disk 16 is driven by the stepping motor 7 via the transmission 8. The stepping motor is driven by the count pulses, which in this example have first been recorded on a magnetic tape or other recording medium. The count pulses are fed, via a circuit having two AND gates 1 and 2, the outputs of which lead to an OR gate 4, to an amplifier 6, the output of which drives the stepping motor.

Once synchronism has been established, the count pulses are regularly passed on via the AND gate 1 and the OR gate 4. The second AND gate 2 comes into play when all its inputs are high.

This is the case when the driven disk 16 lags behind the count pulses recorded on the tape. When describing the second part of the circuit it will be explained in what manner the inputs of the gate 2 get high.

The count pulses can thus be supplied to the OR gate by way of both AND gates. In order to separate the count pulses supplied by both ways, so that they can all exert their influences on the stepping motor, a time-delay circuit 5 is inserted before the AND gate, which circuit gives a delay approximately equal to one half of the difference in time between two subsequent count pulses.

The condition of the input signals B and $\overline{S}$ of the AND gate 2 is determined by the comparator circuit comprising the group of parts situated inside the rectangle indicated by dash lines, which group will be further described hereinafter. In addition to the input signal formed by the count pulses, the gate 1 has the input signal $\overline{S}$. The third input signal of AND gate 2 and the second input signal of AND gate 1 are formed by the count pulses.

The following conditions are possible:

(1) B and $\overline{S}$ high. The pulses are passed on by both AND gates.

(2) B low and $\overline{S}$ high. The count pulses are passed on by AND gate 1 only.

(3) $\overline{S}$ low (the condition of B in this case does not matter). No count pulses are supplied.

Case 1 occurs when the disk has to "catch up."

Case 2 occurs when the reference pulses from the disk and from the band occur substantially simultaneously.

Case 2 occurs when the disk is fast.

The comparator circuit 17 has an input for the reference pulses coming from the magnetic tape and another for the reference pulses coming from the driven disk.

The reference pulses from the tape are supplied to one side of the bistable trigger 14 and to the AND gate 10, those of the disk 16 to one input of the monostable trigger 12 and to the AND gate 11.

The second input of the AND gate 10 is formed by the output $\overline{S}$ of the bistable trigger 14 and the second input of the gate 11 by the output $\overline{A}$ of the monostable trigger 12.

Both gates 10 and 11 have a temporary storage function. They can be realized with the circuit according to FIG. 2.

If the input X is low (for instance −6 volts) and Y is high (ground potential), point S will also be on ground potential.

Then the condenser C is charged.

When a pulse of 6 volts appears at X, then S and therewith also the output Z, will jump to +6 volts and an output pulse will occur.

An output voltage will also occur if, during the presence of the pulse on X, Y goes from ground to a lower potential.

If however, Y and thus also S, are low to start with, S will jump from −6 volts to 0 at the occurrence of an input voltage at X and no output voltage wil loccur at Z.

Therefore, at the arrival of a pulse from the disk 16, no pulse will appear at the output of the gate 11, if $\overline{A}$ is low at that moment, neither will it appear if $\overline{A}$ should become high during the presence of said pulse.

At the neutral position of the triggers B, S and A are low, $\overline{S}$ is high, $\overline{A}$ is high and gate 11 can then let through a reference pulse from disk 16 and gate 10 a pulse from the tape.

If the disk is "fast" with respect to the information from the tape, the reference pulse from the disk 16 will appear earlier than the reference pulse from the tape. The pulse from the disk is let through by gate 11, causing the bistable trigger 14 to go off in such a manner that S becomes high and $\overline{S}$ low. Then the gates 1 and 2 do not let through any more pulses to the stepping motor, which latter remains at a standstill.

Another result of the trigger 14 going off is that the gate 10 is closed.

If, after this, a reference pulse appears from the tape, the trigger 14 is reset, so that $\overline{S}$ becomes high and S becomes low again. Gate 10 remains closed for the duration of the pulse from the tape, notwithstanding the fact that $\overline{S}$ becomes high. Gate 1 is now open again and pulses are again supplied to the stepping motor.

If the disk is "slow" with respect to the information from the tape, then the reference pulse from the tape will appear earlier than the reference pulse from the disk 16.

The pulse from the tape is let through the gate 10, which causes the monostable trigger 12 to go off in such a way that A becomes high and $\overline{A}$ low. The getting high of A has the result that B of the time doubler also becomes high. This again has the result that gate 2 is opened.

Now step pulses are supplied to the stepping motor via gate 1 and delayed step pulses via the gate 2, so that the stepping motor starts stepping at twice the normal rate.

The going off of trigger 12 also has the result that gate 11 is closed to reference pulses from the disk.

Now if after this a reference pulse from the disk appears before the time at which the trigger 12 would have dropped back of its own accord as a result of the monostable character, the trigger 12 is reset, i.e., $\overline{A}$ becomes high and A low again, as a result of the reference pulse from the disk. At this moment the disk can not yet have caught up with the tape, as the number of pulses has been doubled only during the period between the reference pulses from the tape and those of the disk whilst the tape has travelled on in the meantime too. So the disk has made up for one half only of the number of count pulses by which it was "lagging."

By doubling the time during which A is high, which can be effected in the time doubler by means known per se, the disk is enabled to make up for the full arrears, provided these are not excessive, because the trigger 12 can remain in the position in which A is high during a limited period only. If, therefore, the disk is "slow" by more than the period during which A can be at its maximum height, then the appearance of the reference pulse from the disk, after A has become low again, will cause the output S of the trigger 14 to become high and the output $\overline{S}$ to become low, via the gate 11.

Independently of B's being high or not, the supply of step pulses to the stepping motor is interrupted. This state of things is then maintained until a new reference pulse from the tape appears.

By distributing the reference marks asymmetrically it is achieved that, irrespective of the starting position of the disk, the analogous reference pulses after some time occur simultaneously or at least substantially simultaneously.

This automatic synchronization is achieved by the bistable trigger 14 interrupting the supply of pulses to the stepping motor until the next reference pulse from the tape arrives. This is repeated until the analogous reference pulses from the tape and from the disk occur synchronously.

The extra pulses which can appear at the occurrence of reference pulses from the tape, serve the purpose of correcting minor differences, which occur when the disk lags behind after synchronization has been achieved.

In the FIGURE 3 and 3*a* it is indicated, in what manner the count pulses and the reference pulses from the disk, which latter can be fixed on the shaft of the radar antenna, can be joined so as to make it possible to use only one transmitting or recording channel.

As has been stated, it is of advantage to provide the holes in the disk in which the reference pulses are excited, centrally between two adjacent holes in which count pulses are excited.

The count pulses appearing at A of FIG. 3, are represented as time functions under A of FIG. 3*a*. The reference pulses appearing at B of FIG. 3, are represented as time functions under B of FIG. 3*a*.

The reference pulses can, for instance, occur at the angle positions 0°, 45°, 90°, 180° and 270° of the disk with relation to a fixed position.

The pulses A and B are supplied to the OR gate 18 and subsequently pass on to the pulse shaper 19, on the output of which appear the short rectangular pulses C. These are modulated in the modulator 20 and the shape of the outgoing pulses is represented by the sine curve D.

The pulses appearing at D are fed to a recording apparatus, for instance a magnetic tape recorder.

The reference pulses are recorded on the tape between the count pulses, so, when reproducing, it is necessary to separate the two pulse series. This can be effected by the circuit according to FIG. 4.

The pulses recorded on the tape are fed to a demodulator circuit 21. The pulses issuing from this circuit are represented by the signal A of FIG. 4*a*. The pulses go directly to the AND gates 22 and 23 and, via a time-delay circuit 24, to the monostable trigger 25.

The time-delay of 24 is chosen in such a way that the output K of the monostable trigger 25 goes high at or just past the moment at which the incoming count pulse goes low and the trigger is adjusted in such a way that the output K goes low again just before the next count pulse goes high, but only after the reference pulse, which can be present between two successive count pulses, has disappeared.

The output K is thus high between two successive count pulses, so that at the occurrence of a reference pulse both inputs of the gate 22 are high, and the gate is open.

The output $\overline{K}$ on the other hand is high during the count pulse, so that at the occurrence of a count pulse both inputs of the gate 23 are high, and the gate is open. The wave shapes C and D of FIG. 4*a* represent the count pulses and the reference pulses.

What is claimed is:

1. Device for reproducing the movement of a body which repeatedly passes through the same series of positions, characterized in that the moving body is provided with two series of position marks by means of which two series of pulses can be excited, wherein the pulses of the first series serve the purpose of driving a second body, which is already provided with the second series of position marks and is already reproducing the movement of the first body, via a stepping motor and a transmission and the pulses of the second series, hereinafter called reference pulses coming from both bodies are separately supplied to a comparator circuit, which is arranged in such a way that, at the appearance of a reference pulse coming from the first body which is not immediately followed by a reference pulse from the reproducing body, extra driving pulses excited by means of the position marks of the first series of pulses, which are supplied to the stepping motor during a limited period of time and that at the appearance of a reference pulse coming from the body driven by the stepping motor, the supply of pulses is stopped until a reference pulse coming from the first body appears, wherein the position of the position marks of the second series are chosen in such a way that the analogous position marks of two identical bodies cover each other only in one single position of the bodies.

2. Device according to claim 1, wherein the count pulses and the reference pulses of the body the movement of which is to be reproduced, are joined in such a way that one single transmitting or recording channel can be employed for both types of pulses.

3. A device for reproducing the movement of a first rotating body which repeatedly passes through the same series of positions, comprising, means to produce a train of count pulses as said first body rotates, means controlled by said count pulses to rotate a second body, means on both of said bodies to produce trains of reference pulses, said trains of reference pulses being produced by similar arrays of reference points unsymmetrically distributed along the periphery of said first and second bodies, means to apply said trains of reference pulses to a comparator circuit, said comparator circuit being arranged to interrupt said count pulse train if a reference pulse from said second body is applied to said comparator circuit prior to a reference pulse from said first body and to provide extra count pulses if a reference pulse from said second body does not immediately follow a reference pulse from said first body.

4. A device for reproducing the movement of a first rotating body, comprising, means on said first body to produce a train of count pulses as said first body rotates, means to apply said count pulses to a stepping motor, a second rotating body driven by said stepping motor, means on both of said bodies to produce trains of reference pulses, said reference pulses being produced by similar arrays of reference points unsymmetrically distributed along the periphery of said first and second bodies, means to apply said trains of reference pulses to a comparator circuit, said comparator circuit including means to stop the supply of count pulses to said stepping motor if a reference pulse from said second body is applied to said comparator circuit prior to a reference pulse from said first body, said comparator circuit also including means to provide extra count pulses to said stepping motor if a reference pulse from said second body does not immediately follow a reference pulse from said first body.

No references cited.

NEIL C. READ, *Primary Examiner.*

H. PITTS, *Assistant Examiner.*